United States Patent [19]

Smith

[11] 4,179,375
[45] Dec. 18, 1979

[54] AERATION OF WASTE IN SEPTIC TANK

[76] Inventor: Alvin J. Smith, 228 Cordova Dr., Santa Barbara, Calif. 93109

[21] Appl. No.: 953,475

[22] Filed: Oct. 23, 1978

Related U.S. Application Data

[63] Continuation of Ser. No. 823,622, Aug. 11, 1978, abandoned.

[51] Int. Cl.² ............................................. C02C 1/08
[52] U.S. Cl. .................................. 210/197; 210/220; 261/36 R; 261/121 R; 261/DIG. 75
[58] Field of Search ......... 261/36 R, 121 R, DIG. 47, 261/DIG. 75; 210/3, 4, 6, 7, 14, 15, 194, 197, 198 R, 199, 220, 74, 205

[56] References Cited

U.S. PATENT DOCUMENTS

| | | | |
|---|---|---|---|
| 2,126,164 | 8/1938 | Anderson | 210/194 |
| 2,212,841 | 8/1940 | Maxwell | 210/220 |
| 2,479,403 | 8/1949 | Powers | 210/7 |
| 2,978,234 | 4/1961 | Lamb | 210/220 |
| 3,271,304 | 9/1966 | Valdespino | 210/14 |
| 3,388,057 | 6/1968 | Callahan | 210/7 |
| 3,525,685 | 8/1970 | Edwards | 210/170 |
| 3,662,890 | 5/1972 | Grimshaw | 210/3 |
| 3,709,363 | 1/1973 | Smart | 210/220 |
| 3,756,220 | 9/1973 | Tehrani | 261/DIG. 75 |
| 3,788,478 | 1/1974 | Savage | 210/197 |
| 3,984,322 | 10/1976 | Peasley | 210/220 |
| 3,997,437 | 12/1976 | Prince et al. | 210/4 |
| 4,065,385 | 12/1977 | Aktay | 210/197 |

FOREIGN PATENT DOCUMENTS 802374 10/1958 United Kingdom ....................... 210/15

Primary Examiner—Charles N. Hart
Assistant Examiner—Ernest G. Therkorn
Attorney, Agent, or Firm—William W. Haefliger

[57] ABSTRACT

Apparatus for use in an aerated sewage disposal system to aerate sewage waste in a septic tank comprises:
(a) means including ducting to effect flow of waste from the tank, and to effect return flow of said waste to the tank,
(b) other means to effect entry of oxidizing fluid into the waste flow,
(c) said first means including distributed outlet means in the tank to discharge said oxidizing fluid in the form of small bubbles into the waste in the tank along with return of the flowing waste into the tank.

The discharge into the tank causes a revolving flow of waste in the tank; and the outlet means may include a duct with a self-closing slit.

4 Claims, 7 Drawing Figures

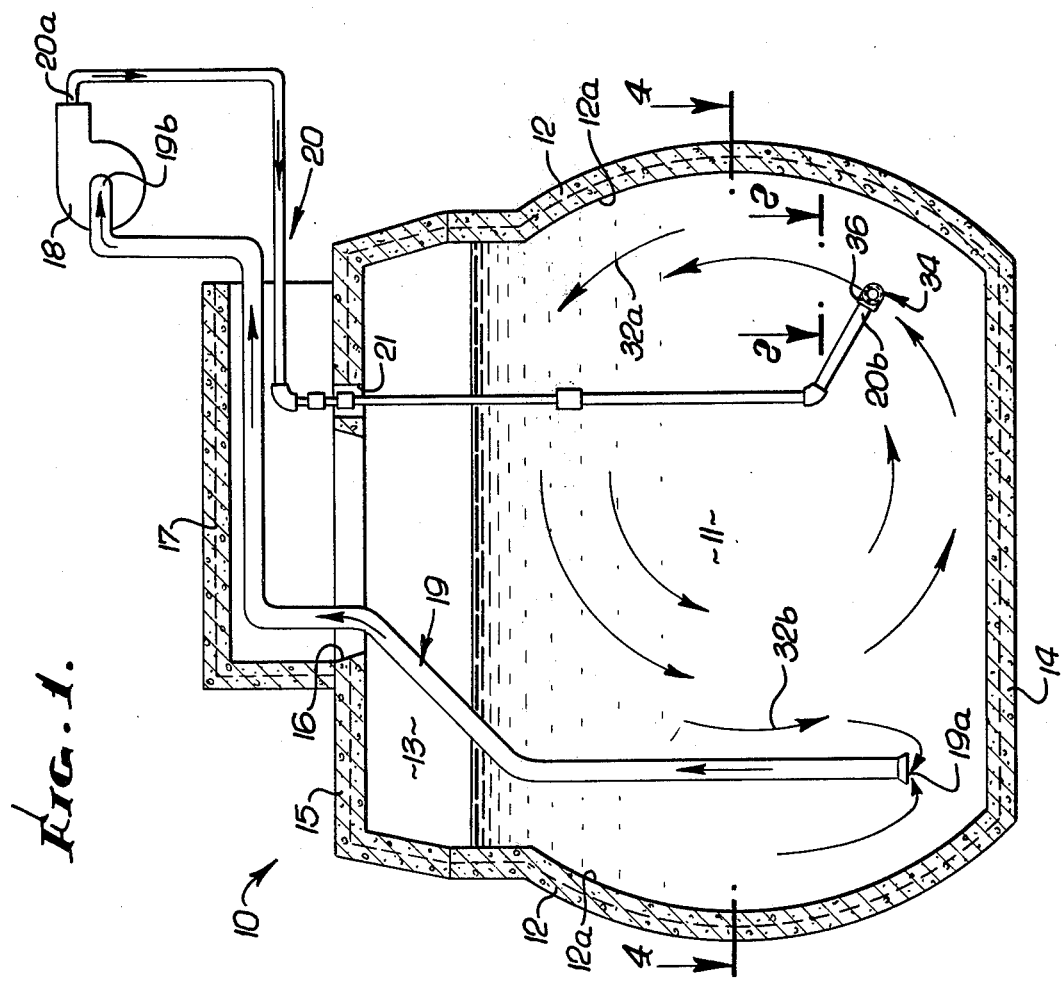
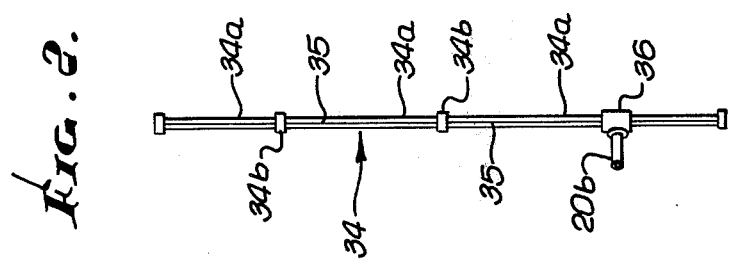
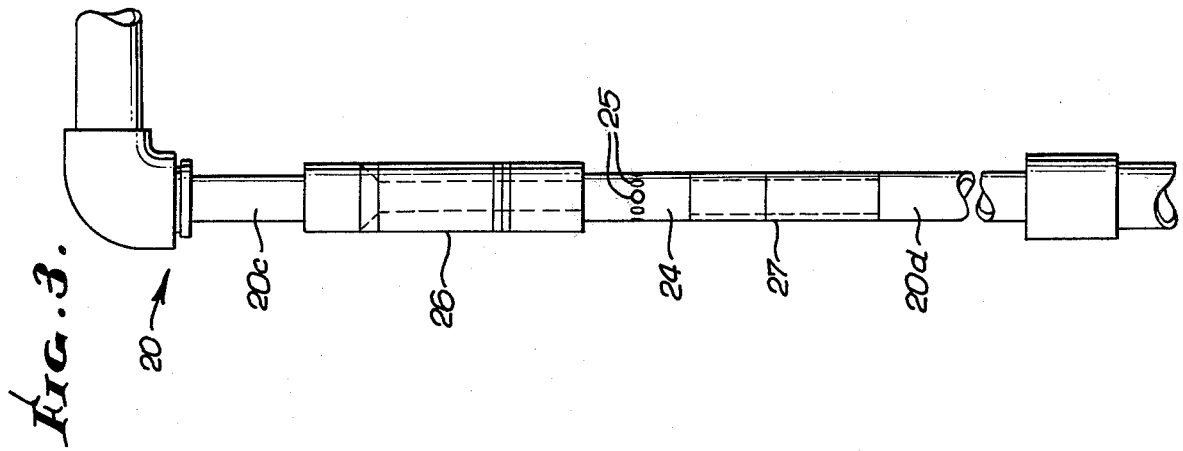

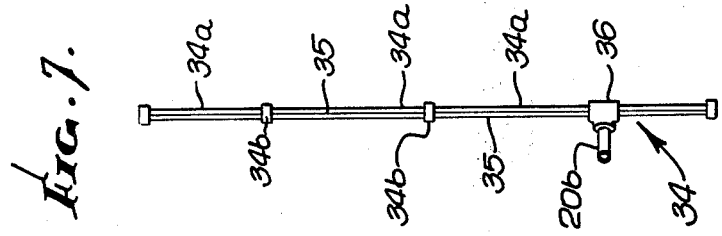
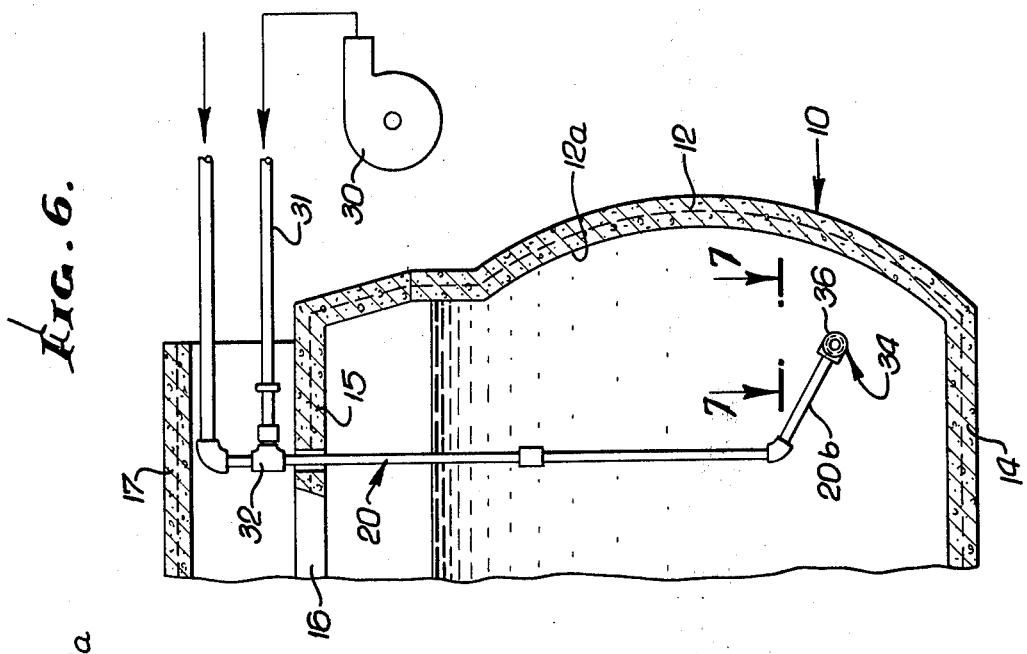
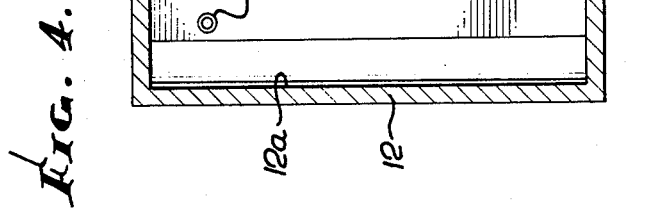

AERATION OF WASTE IN SEPTIC TANK

This is a continuation of application Ser. No. 823,622, filed Aug. 11, 1978, now abandoned.

BACKGROUND OF THE INVENTION

This invention relates generally to treatment of sewerage, and more particularly concerns apparatus and method to aerate and diffuse solid material in low cost as well as other sewerage disposal systems.

At the present time, many problems occur and recur in the physical treatment of sewage solids. Among these are incomplete break-up of sludge or solids due to irregular distribution of same, or so-called "pocketing"; clogging of sludge pumps; and the difficulty of removal of sludge from tanks or basins. Also, there is no fully satisfactory method to continuously treat sludge in a tank where it collects, the objective being break-up and diffusing of the sludge or solids into small flowable particles.

SUMMARY OF THE INVENTION

It is a major objective of the invention to provide solutions to the above and other associated problems and difficulties. Basically, sewage treatment apparatus incorporating the invention is adapted to extend into a septic tank, and includes:

(a) first means including ducting to effect flow of waste from the tank and to effect return flow of said waste to the tank, (b) other means to effect entry of oxidizing fluid into the waste flow, (c) said first means including distributed outlet means in the tank to discharge said oxidizing fluid in the form of small bubbles into the waste in the tank along with return of the flowing waste into the tank.

As will appear, the first means may include pump connected suction and return lines, with the distributed outlet means connected with the return line and located in the tank to create a revolving flow of waste liquid upwardly and downwardly in the tank for optimizing air discharge and absorption into the waste liquid and reducing sludge accumulation; the distributed outlet means may advantageously include plastic pipe sections which are slit to pass waste liquid and injected air into the waste in the tank, the slits adapted to close when the pump ceases operation; and air may be either pressure fed into the return line or aspirated into that line.

These and other objects and advantages of the invention, as well as the details of an illustrative embodiment, will be more fully understood from the following description and drawings, in which:

DRAWING DESCRIPTION

FIG. 1 is a vertical section through a septic tank and showing apparatus embodying the invention;

FIG. 2 is a plan view on lines 2—2 of FIG. 1;

FIG. 3 is an enlarged vertical elevation showing details of the waste return line depicted in FIG. 1;

FIG. 4 is a schematic plan view, on lines 4—4 of FIG. 1;

FIG. 5 is an enlarged section on lines 5—5 of FIG. 4;

FIG. 6 is a view like FIG. 1, showing a modification; and

FIG. 7 is a view like FIG. 2, but taken on lines 7—7 of FIG. 6.

DETAILED DESCRIPTION

In the drawings, a septic tank 10 contains liquid sewerage or waste 11, between elongated parallel side walls 12, upright end walls 13 and 13a and bottom wall 14. Side walls 12 are outwardly bowed, as shown, so that they define upwardly facing concave surfaces 12a. A top wall 15 defines an outlet or manhole opening 16, and is covered by a pre-cast concrete box 17 which is removable for gaining access to the manhole 16. The tank itself may consist of cast concrete, or other material.

In accordance with the invention, first means is provided to effect flow of waste from the tank, and to effect return flow of waste to the tank. Such means may advantageously include an external pump 18, a suction line 19 having an intake end 19a extending into the waste in the tank and a discharge end 19b, and a return line 20 having an intake end 20a and an opposite end extending into the tank. Entrance end 19a of line 19 is typically near the bottom wall 14 and also near one end wall 13 of the tank and one side wall 12. Discharge end 19b may be located at the pump intake. Entrance end or intake 20a of return line 20 may be located at the pump discharge, and line 20 may have its opposite end 20b extended into the waste in the tank interior. The pump is operable to effect flow of waste (liquid and comminuted solids) between line ends 19b and 20a. Line 19 may extend through opening 16, and line 20 through a smaller opening 21 in top wall 15.

In addition, other means is provided to effect entry of oxidizing fluid into the waste flow via the lines. As shown in FIGS. 1 and 3, such other means may advantageously include tubing having ports via which air is aspirated into the return flow of waste. For example, the tubing may include a pipe 24 with side wall ports 25, the pipe connected in series with reducer 26 and reducer 27. The reducers 26 and 27 have bores of diameter ½ inch and ¾ inch, respectively, such bore diameters being smaller than the bore diameter of pipe 24. The return line 20 is shown in FIG. 3 to include polyvinylchloride sections 20c and 20d connected with the reducers. An alternative means to effect entry of air into the return line 20 is shown in FIG. 6 to include auxiliary means to produce a side stream of air injected into the return flow of waste. For example, a pump 30 may displace air under pressure into a pipe 31 connected via tee 32 into return line 20.

An important feature of the invention is the inclusion by the first means of distributed outlet means in the tank to discharge the oxidizing fluid in the form of small bubbles into the tank waste; along with return of flowing waste into the tank, all in such manner that a revolving flow of aerated waste is created in the tank, i.e. upwardly near one wall 12a and downwardly closer to the opposite wall 12a. See in this regard the upward flow arrows 32a and the downward flow arrows 32b, in FIG. 1.

The distributed outlet means typically includes at least one elongated slit through a duct side wall, the slit extending lengthwise of the duct. Such a duct is shown at 34 in FIGS. 1 and 2, as made up on sections 34a coupled together at 34b. The sections may consist of 1½ inch polyvinylchloride pipe having knife slits 35 along their total lengths, and at the tops of the pipe sections as oriented of FIG. 1. See also FIG. 5, Return line 20 includes side section 20b connected to the duct 34, as shown, as via a tee 36. Waste escapes from the slits as a result of pressurized expansion of the sections 34a; but when pump 18 is shut down, the pressure is reduced and the slits 35 close to prevent ingress of waste particles of a size that could clog the sections 34a. A screen may be located at the intake 19a to prevent ingress of such larger sized particles into the circulation lines 19 and 20.

The resultant action of the above described apparatus gives the waste water a good rolling motion, whereby oxygen from the atmosphere is absorbed into the waste water at its upper surface in the tank, at the same time that air is being injected into the water below the surface and under pressure, by the special air injection means. Efficient operation is gained because the injected air is in the form of very small bubbles, in the micron range of 5 to 10 microns, giving a maximum of air-to-water contact. The whole operation is very quiet, unlike conventional blower units, which are very noisy.

Another advantage can be gained by taking advantage of hydraulic loading, i.e. injecting water at one end of the tank and forcing a movement of waste back to the other end of the tank where the suction line intake is located. In this regard, waste water typically weighs 8.3 lbs. per gallon. This weight can be used to good advantage, by placement of the injectors, in certain arrangements, so that the bottom layer of sludge is caused to move in any direction desired. For instance, a 3,000 gallon treatment plant might have 3 injectors placed 5 feet apart, with distribution lag, and directing the flow against the side of a tank.

Arranging several injectors at one end of the tank will create a hydraulic load (weight difference) by the difference in the weight and volume of water pumped into one end of the system, (332 lbs. per minute or about 5000 lbs of water in 15 minutes). The water and sludge move in the direction of the suction pipe intake. This gives the tank a complete cleansing action, removing the bottom sludge. The action of moving the complete contents in the direction of the suction pipe opening will in a period of ½ hr. completely turn over and treat each and every gallon of waste effluent in the tank.

The waste may have oxygen forced into it by a pressure of some 20 to 25 lbs. Under such pressure, the waste water will retain more oxygen and will accept the oxygen at a quicker rate than normally expected with known types of aeration units. The effluent will then be low in BOD and suspended solids.

I claim:

1. In an aerated sewage disposal system to aerate sewage waste in a septic tank having walls curved to aid in causing a revolving flow of waste and including said tank having opening means in the top of the tank above the level of said waste, the combination comprising
    (a) ducting means to effect flow of waste from the tank, and to effect return flow of said waste to the tank,
    (b) additional means connected to said ducting means to effect entry of oxidizing fluid into the waste flow of said ducting means,
    (c) said first means including distributed outlet means in the tank to discharge said oxidizing fluid in the form of small bubbles into the waste in the tank along with return of the flowing waste into the tank,
    (d) said ducting means including a pump, a suction line extending through said opening means and having an intake end extending into waste in the tank and a discharge end, a return line in the form of piping extending through said opening means and having an intake end and an opposite end extending into the tank and connected to the distributed outlet means, the pump operable to effect flow of waste between the suction line discharge end and the return line intake end, said means to effect entry of oxidizing fluid into the waste flow connected to the return line above the level of waste in the tank to effect said entry of oxidizing fluid into the waste flowing in the return line to mix therewith as the waste flows downwardly in said return line in the tank, said distributed outlet means located in the tank to create a revolving flow of waste upwardly and downwardly in the tank,
    (e) said distributed outlet means being openly unconfined within the tank and including at least one elongated slit through a duct side wall defined by the distributed outlet means, the slit extending lengthwise of said duct and lengthwise of the tank so as to be substantially parallel to the axis of rotation of the revolving flow, the duct consisting of expandable material and characterized in that the slit widens in response to application of pressure to waste liquid flowing in the duct, the slit being closed in the absence of pressure application to said waste liquid within said distributed outlet means, the slit located at generally the same lower interior level in the tank as the intake end of the suction line,
    (f) said return line extending downwardly from said opening and toward said distributed outlet means whereby pressurized waste in said return line exerts pressure sufficient to effect opening of said slit,
    (g) said slit located proximate one interior curved side of the tank, and said intake end of the suction line located proximate another interior curved side of the tank which faces oppositely toward said one side of the tank.

2. The combination of claim 1 wherein said means to effect entry of oxidizing fluid into the waste flow includes tubing having ports via which air is aspirated into the return flow of waste.

3. The combination of claim 1 wherein said means to effect entry of oxidizing fluid into the waste flow includes auxiliary means to produce a side stream of air injected into the return flow of waste.

4. The combination of claim 1 wherein the distributed outlet means includes plastic pipe sections which are connected end to end to define multiple of said slits.

* * * * *